No. 855,104. PATENTED MAY 28, 1907.
J. J. HEALY.
SELF PLAYING PIANO.
APPLICATION FILED DEC. 26, 1902.
10 SHEETS—SHEET 1.
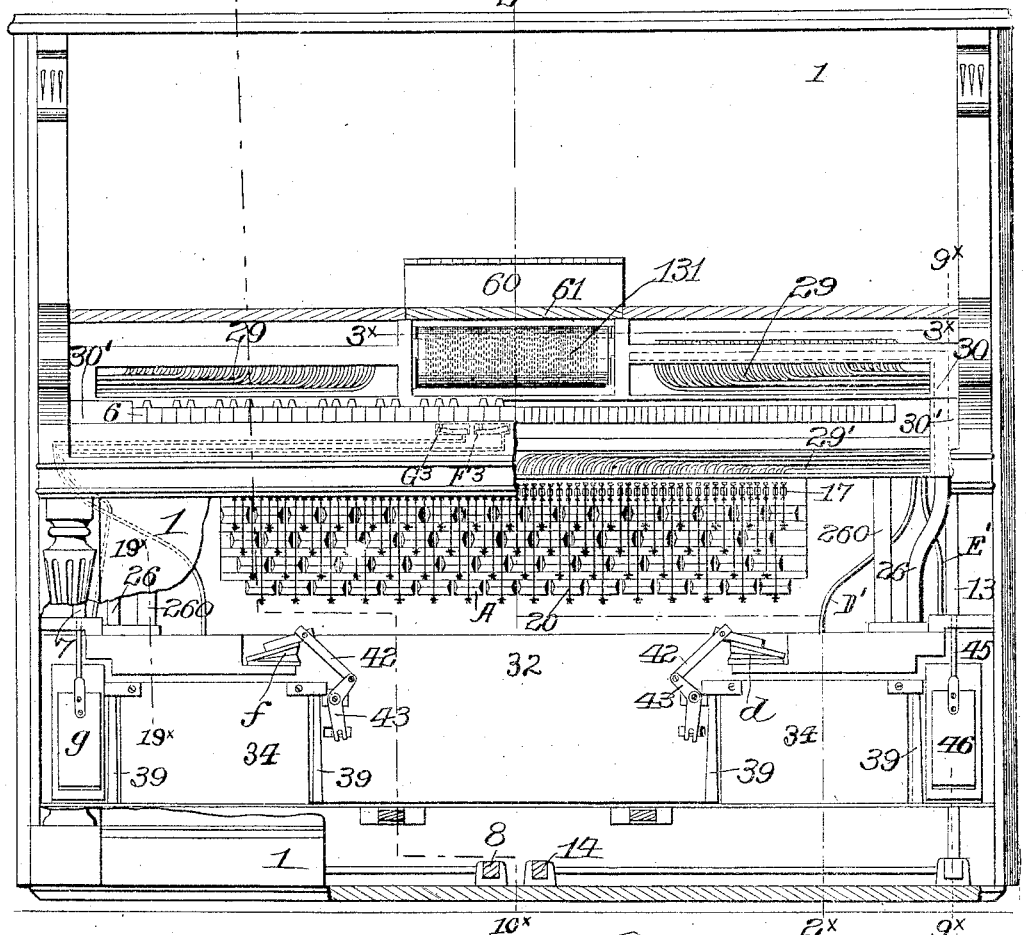
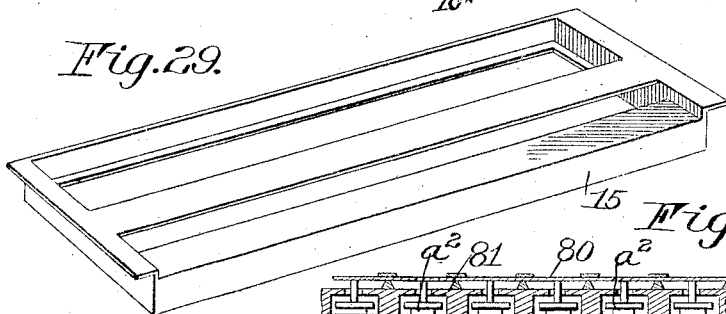

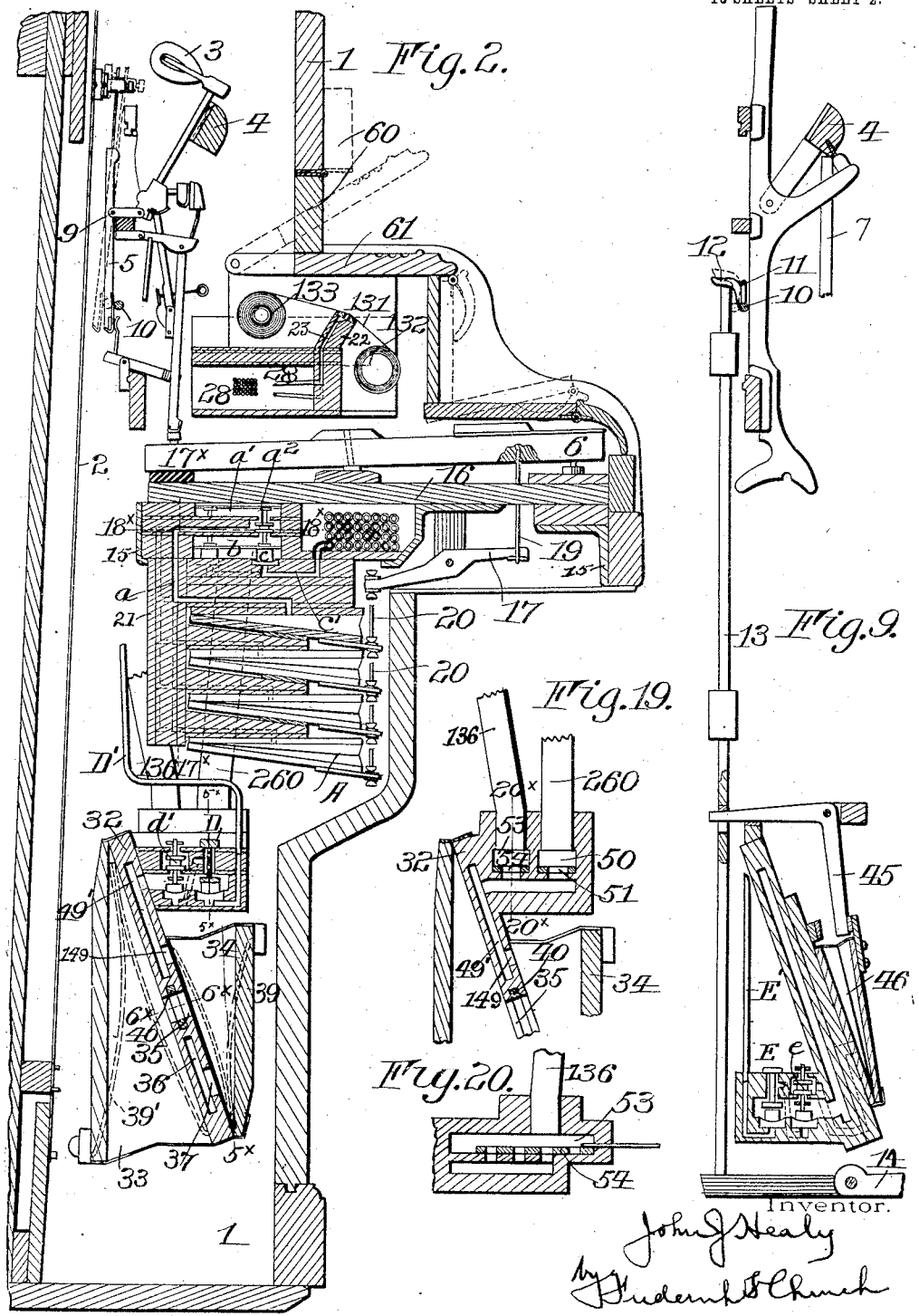

No. 855,104. PATENTED MAY 28, 1907.
J. J. HEALY.
SELF PLAYING PIANO.
APPLICATION FILED DEC. 26, 1902.
10 SHEETS—SHEET 3.
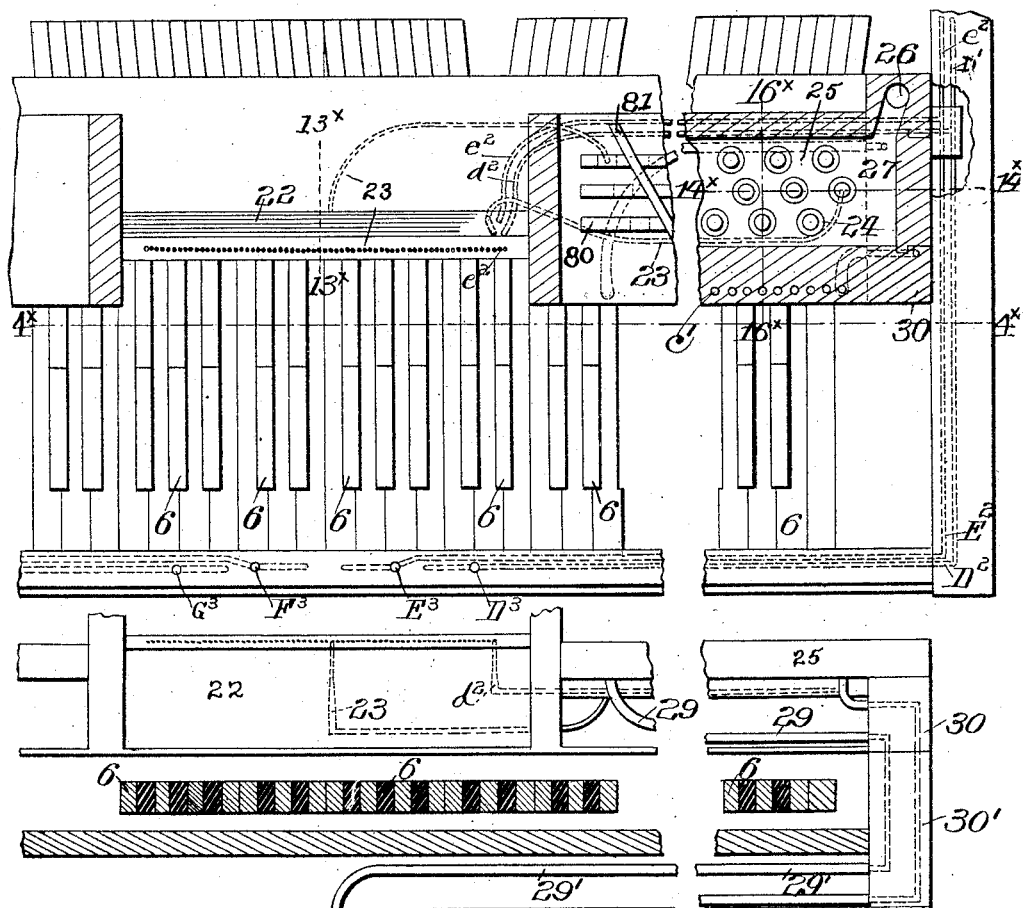
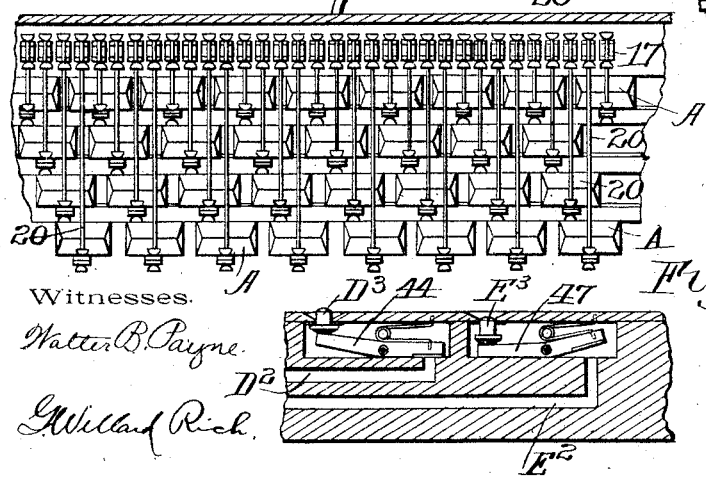
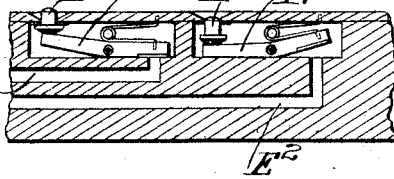
Witnesses.
Walter B. Payne.
G. Willard Rich.
Inventor.
John J. Healy
by Frederick T. Church
his Attorney.

No. 855,104. PATENTED MAY 28, 1907.
J. J. HEALY.
SELF PLAYING PIANO.
APPLICATION FILED DEC. 26, 1902.
10 SHEETS—SHEET 4.
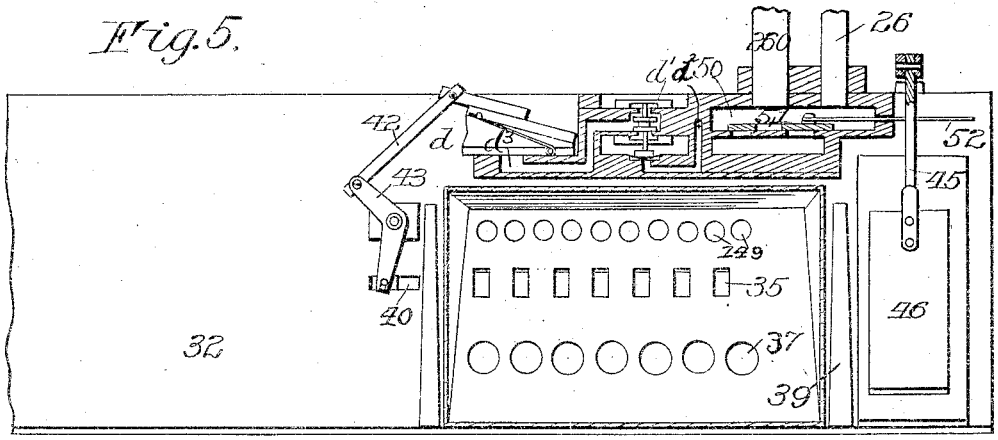
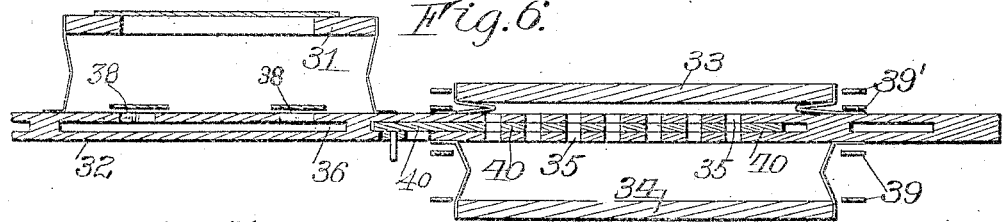
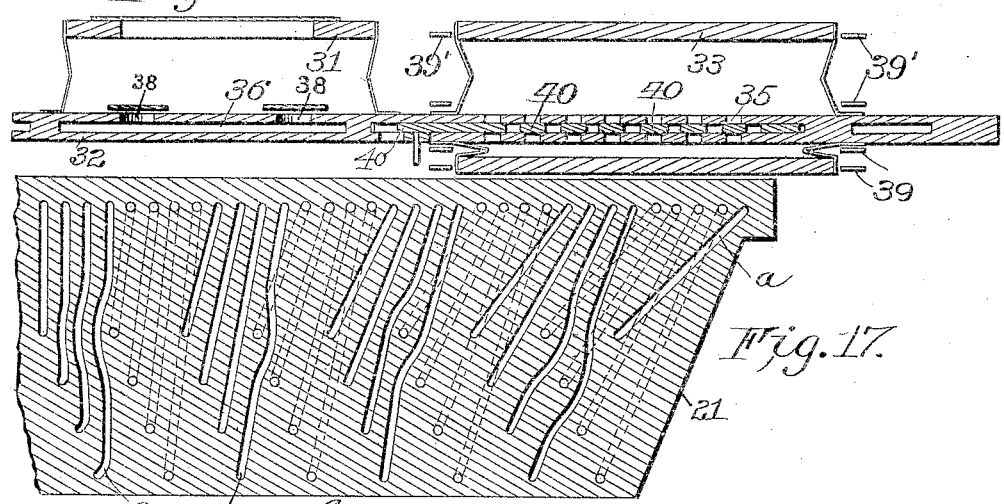
Witnesses
Walter B. Payne
G. Willard Rich
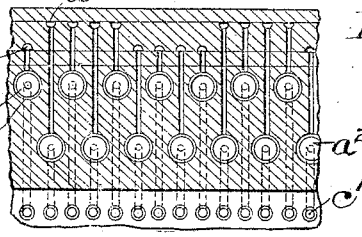
Inventor.
John J. Healy
by Frederick T. Church
his Attorney No. 855,104. PATENTED MAY 28, 1907.
J. J. HEALY.
SELF PLAYING PIANO.
APPLICATION FILED DEC. 26, 1902.
10 SHEETS—SHEET 5.
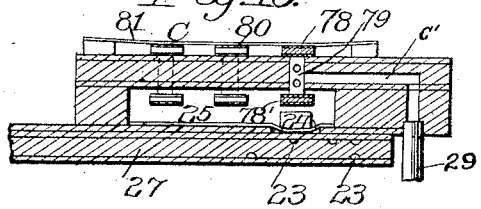
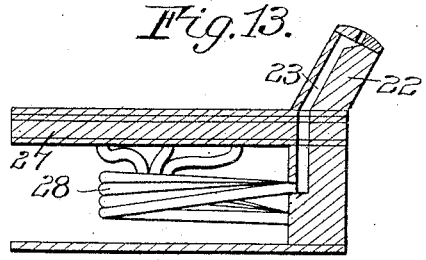
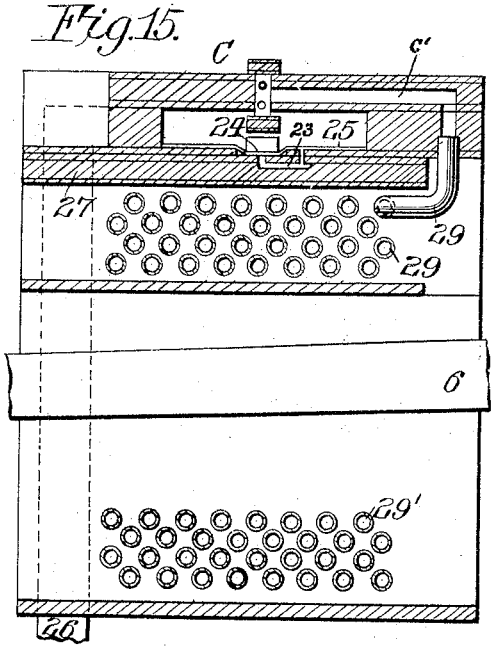
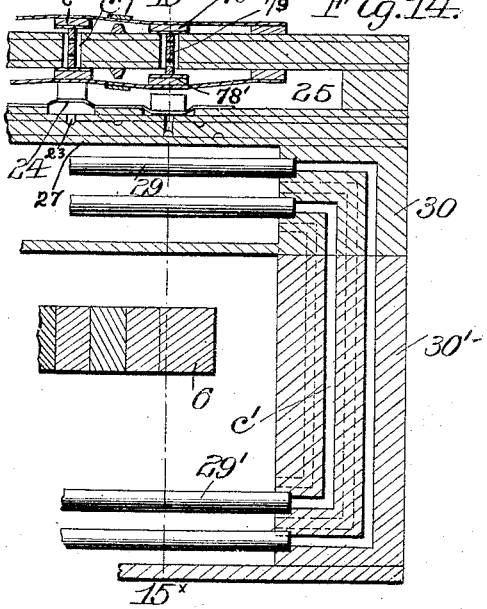
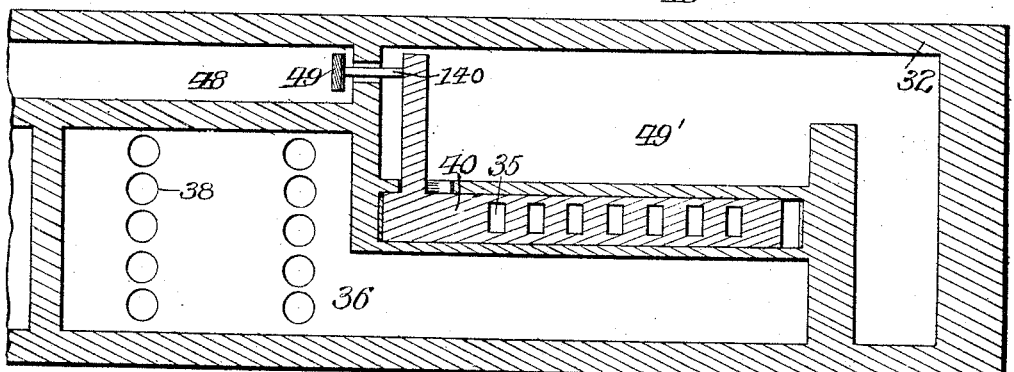
Witnesses
Walter B. Payne
G. Willard Rish
Inventor
John J Healy
by Frederick F Church
his Attorney No. 855,104. PATENTED MAY 28, 1907.
J. J. HEALY.
SELF PLAYING PIANO.
APPLICATION FILED DEC. 26, 1902.
10 SHEETS—SHEET 6.
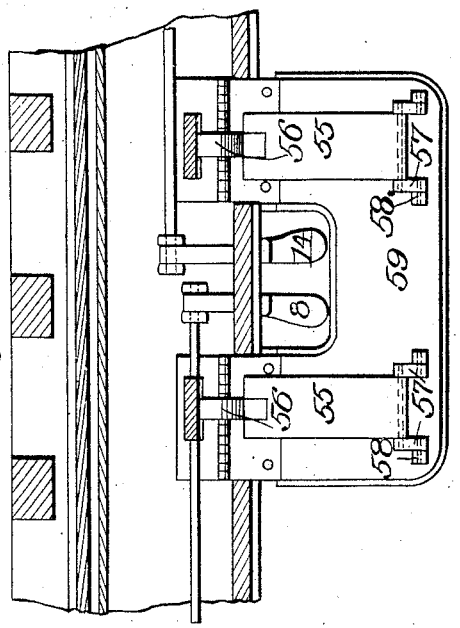
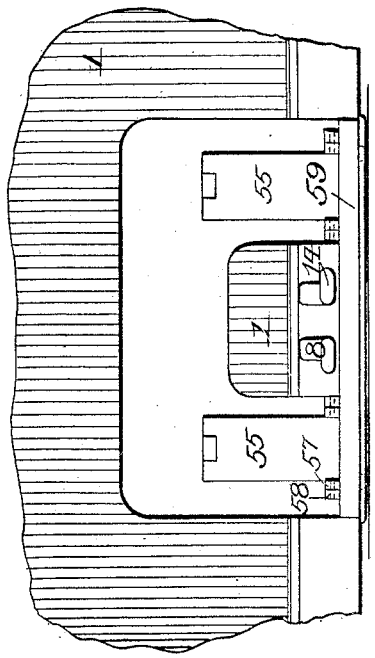
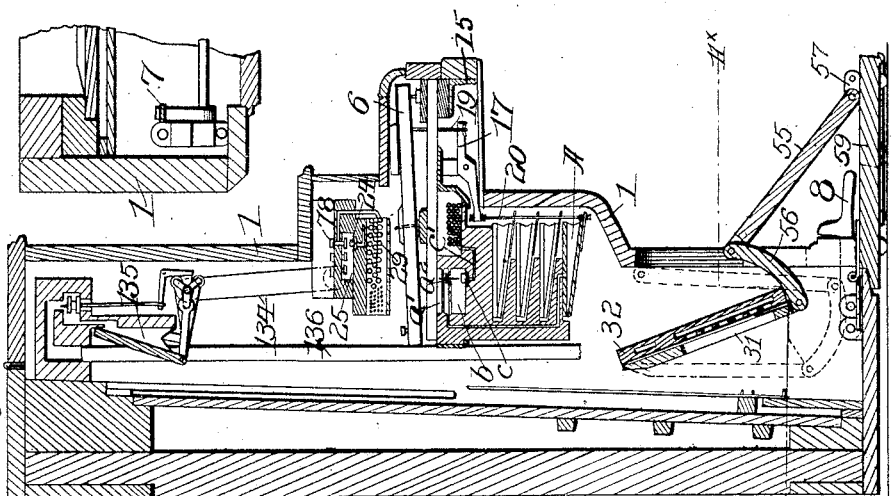

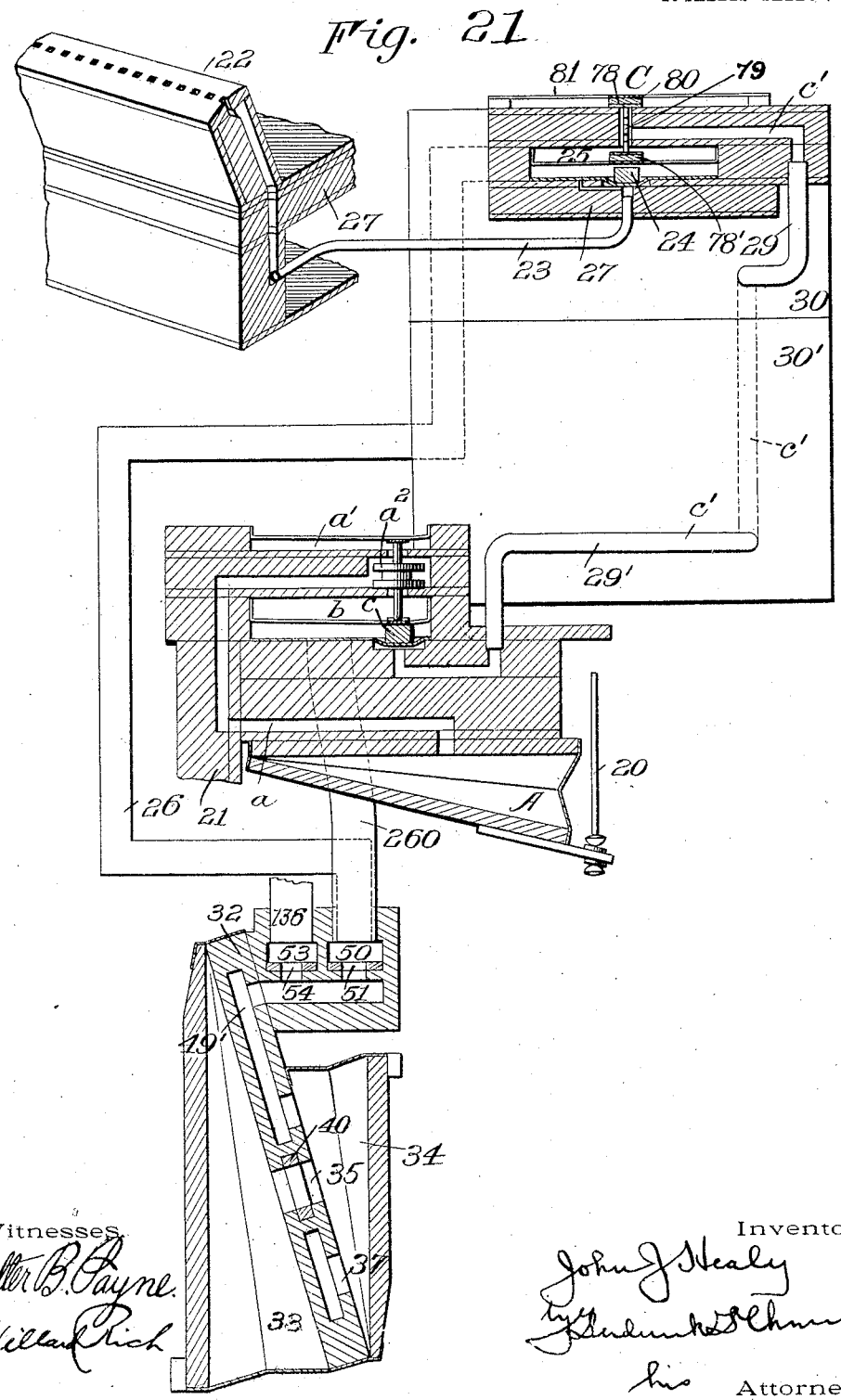

No. 855,104. PATENTED MAY 28, 1907.
J. J. HEALY.
SELF PLAYING PIANO.
APPLICATION FILED DEC. 26, 1902.
10 SHEETS—SHEET 8.
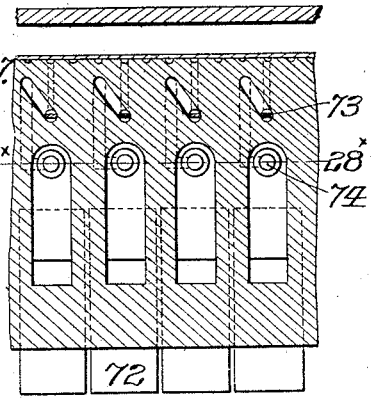
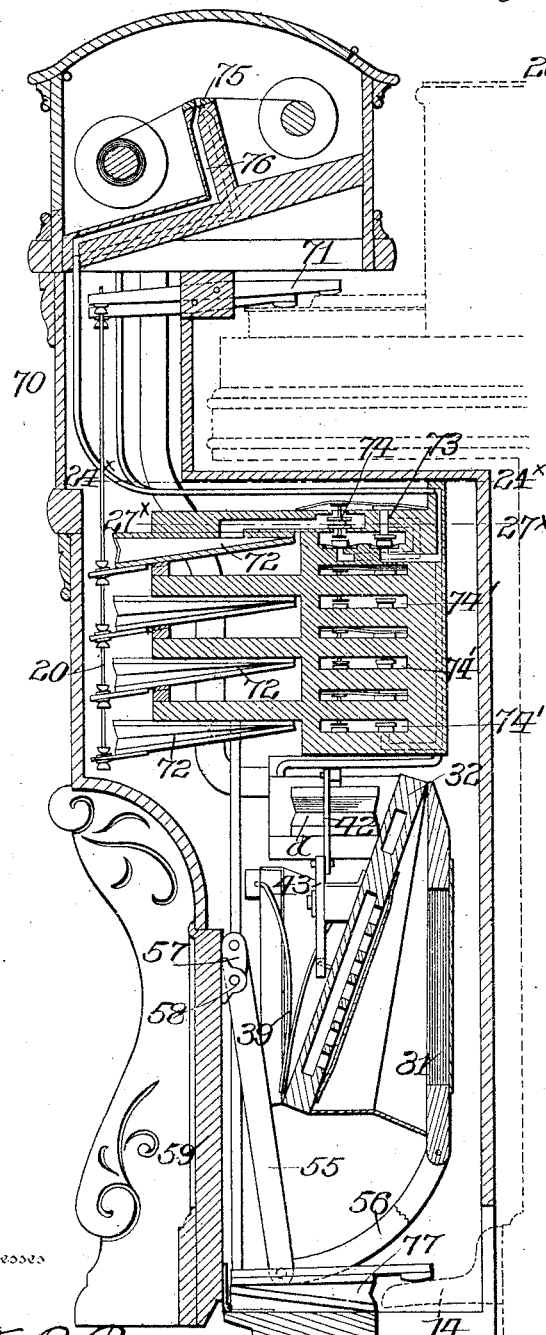

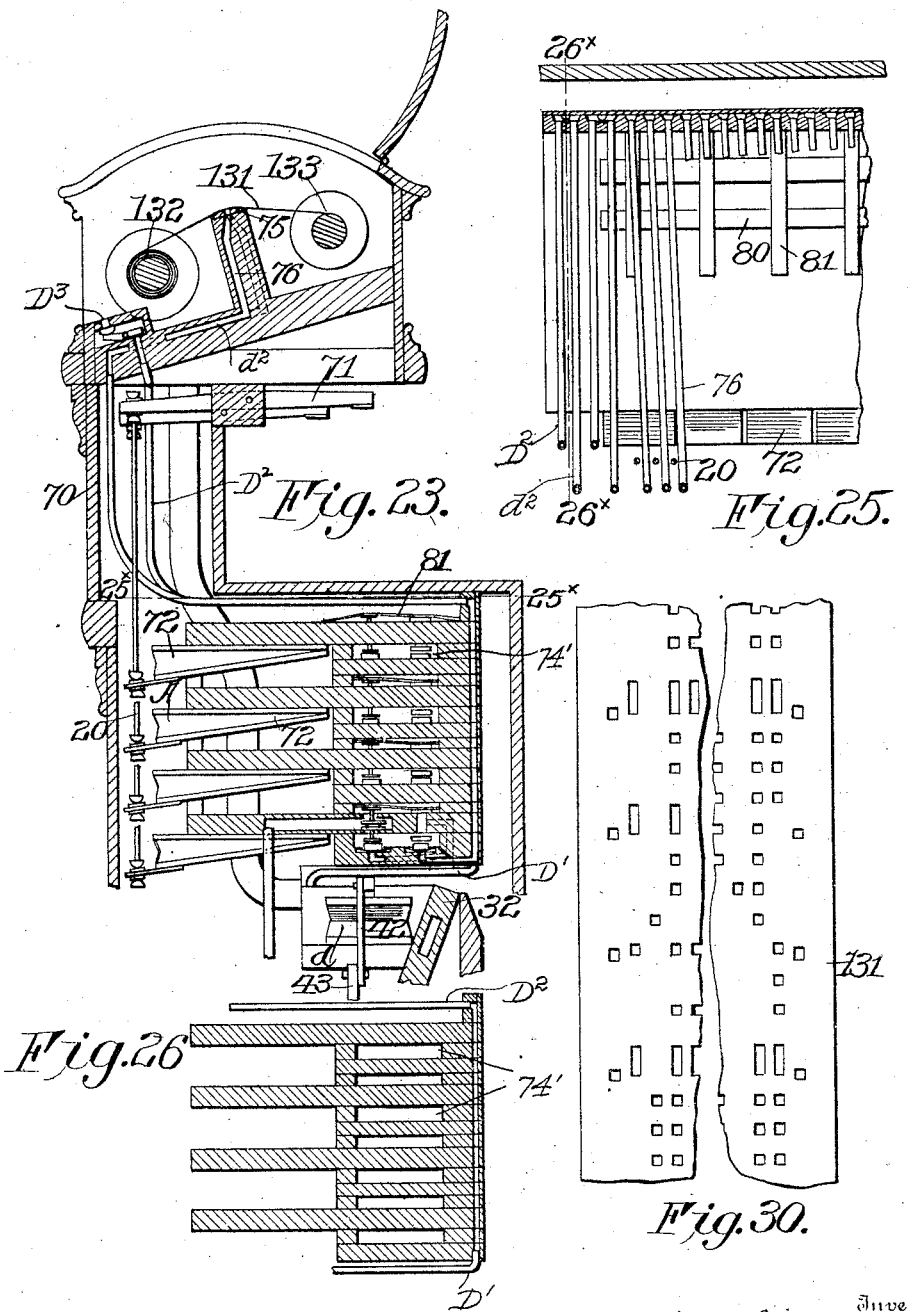

No. 855,104. PATENTED MAY 28, 1907.
J. J. HEALY.
SELF PLAYING PIANO.
APPLICATION FILED DEC. 26, 1902.
10 SHEETS—SHEET 10.
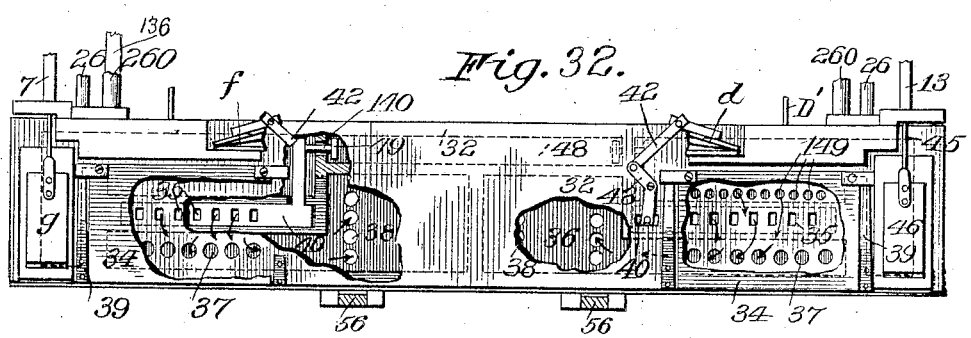
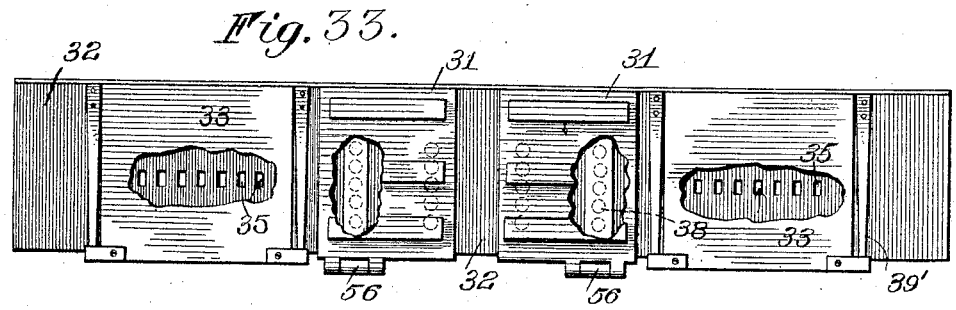

UNITED STATES PATENT OFFICE.

JOHN J. HEALY, OF ROCHESTER, NEW YORK, ASSIGNOR OF ONE-HALF TO SOLOMON F. HESS, OF ROCHESTER, NEW YORK.

SELF-PLAYING PIANO.

No. 855,104.    Specification of Letters Patent.    Patented May 28, 1907.

Application filed December 26, 1902. Serial No. 136,530.

*To all whom it may concern:*

Be it known that I, JOHN J. HEALY, of Rochester, in the county of Monroe and State of New York, have invented certain new and useful Improvements in Self-Playing Pianos; and I do hereby declare the following to be a full, clear, and exact description of the same, reference being had to the accompanying drawings, forming a part of this specification, and to the reference-numerals marked thereon.

My present invention has for its object to provide a piano playing mechanism adapted to be applied to a piano whereby the latter may be automatically operated by mechanical devices so arranged that they may be conveniently inclosed within the usual frame or casing of the instrument and adapted to operate upon the keys or manuals in such a manner that the latter may be operated by a player either independently or simultaneously with the playing mechanism.

My invention has for its further object to provide a means whereby an operator may control the expression given to a note or a set of notes, by governing the force with which the respective keys are operated, independently of the operation of other notes sounded simultaneously therewith.

To these and other ends the invention consists in certain improvements and combinations of parts, all as will be hereinafter more fully described, the novel features being pointed out in the claims at the end of the specification.

In the drawings: Figure 1 is a front elevation of a piano shown with the casing broken away to better illustrate the application thereto of an operating device constructed in accordance with my invention. Fig. 2 is a vertical sectional view on the line $2^\times$—$2^\times$ of Fig. 1 showing the operating parts of the piano forte and the operating mechanism therefor. Fig. 3 is a horizontal sectional view on the line $3^\times$—$3^\times$ of Fig. 1 showing the air conduits leading from the tracker board to the primary valves and also the supplemental expression keys. Fig. 3ª is a detail sectional view. Fig. 4 is a vertical sectional view on the line $4^\times$—$4^\times$ of Fig. 3 showing the same parts in elevation and the key operating pneumatics in addition thereto. Fig. 5 is a detail sectional view through the high tension bellows and adjacent parts operating in connection therewith and taken on the line $5^\times$—$5^\times$ of Fig. 2. Figs. 6 and 7 are longitudinal horizontal sectional views through the division board, taken on the line $6^\times$—$6^\times$ of Fig. 2 showing the operation of the high and low tension bellows and the regulating damper between them. Fig. 8 is a longitudinal sectional view showing one-half of the division board. Fig. 9 is a vertical sectional view on the line $9^\times$—$9^\times$ of Fig. 1 showing the damper controlling mechanism. Fig. 10 is a view similar to Fig. 2 showing the pneumatic motor and the pumping pedals taken on the line $10^\times$—$10^\times$ of Fig. 1. Fig. 11 is a sectional view on the line $11^\times$—$11^\times$ of Fig. 10. Fig. 12 is a front elevation of the pumping pedals. Fig. 13 is a sectional view on the line $13^\times$—$13^\times$ of Fig. 3 showing the tracker board and conduits leading therefrom. Fig. 14 is a vertical sectional view on the line $14^\times$—$14^\times$ of Fig. 3. Fig. 15 is a similar view on the line $15^\times$—$15^\times$ of Fig. 14. Fig. 16 is a detail sectional view on the line $16^\times$—$16^\times$ of Fig. 3. Fig. 17 is a sectional view on the line $17^\times$—$17^\times$ of Fig. 2. Fig. 18 is a similar view on the line $18^\times$—$18^\times$ of Fig. 2. Fig. 19 is a sectional view on the line $19^\times$—$19^\times$ of Fig. 1, and Fig. 20 is a similar view on the line $20^\times$—$20^\times$ of Fig. 19. Fig. 21 is a diagrammatic view illustrating the relative arrangement of the pneumatic operating devices. Fig. 22 is a vertical sectional view of a modification showing the mechanism applied to a device adapted to be used as an attachment to a piano. Fig. 23 is a similar view illustrating the expression controlling devices. Fig. 24 is a sectional view on the line $24^\times$—$24^\times$ of Fig. 22. Fig. 25 is a similar view on the line $25^\times$—$25^\times$ of Fig. 23. Fig. 26 is a sectional view on the line $26^\times$—$26^\times$ of Fig. 25. Fig. 27 is a sectional view on the line $27^\times$—$27^\times$ of Fig. 22. Fig. 28 is a detail sectional view taken on the line $28^\times$—$28^\times$ of Fig. 27. Fig. 29 is a detail perspective view of the key-bed frame. Fig. 30 is a view of a portion of the music sheet. Fig. 31 is a longitudinal sectional view through the wind-chest of the secondary valves. Fig. 32 is a front elevation of the division board, portions being broken away to better illustrate the board and the parts operating in connection therewith, and Fig. 33 is a similar view of the rear side of the board.

Similar reference numerals in the several figures indicate similar parts.

In illustrating my invention I have shown it applied to an upright pianoforte provided with a casing 1 and embodying the usual frame upon which are stretched the strings 2 with which coöperate the hammers 3 adapted to be operated by any desired form of action, as will be understood, the only portions thereof to which it is necessary to refer specifically being the hammer rail 4, the damper lever 5 and the key or digital 6. These parts all operate in a well known manner, the hammer rail 4 being movable relatively to the strings by means of a lifting rod 7 operated by the soft pedal 8, by means of which the stroke of the hammers is adjusted to regulate the force with which they strike the strings. The damper levers 5 pivoted at 9 are operated upon by a swinging bar 10, pivoted at 11, and provided with a lever arm 12 with which engages a lifting rod 13 adapted to be elevated by the loud pedal 14 whereby all of the levers may be moved, as shown in dotted lines in Fig. 2, and their pads held out of engagement with the strings so that they may vibrate without check.

The operating mechanism constructed in accordance with my invention is all adapted to be included within an upright piano casing of the usual size and form, the only change in the construction being to form the breast, or forwardly extending portion arranged beneath the outer ends of the keys, hollow as shown in Figs. 2 and 10, the required amount of strength being obtained by using a metallic frame 15 (Fig. 29) set into the end frames of the casing, and serving to support the key-bed 16 and the pneumatic key-operating mechanism. The frame 15 is preferably made in an open rectangular form comprising front and rear side pieces and end bars which latter are connected by a longitudinally extending cross bar dividing said frame into forward and rear compartments. The former comprises the hollow breast in which are pivotally mounted the key-operating levers 17, and the walls of the rear compartment serve as a support from which the pneumatic key-operating mechanism is suspended. The outer ends of the levers 17 project into the looped ends of bars 19 projecting downwardly from the keys, said loops being elongated or open at their upper sides thereby permitting the keys to be operated independently of their levers 17. At their rear ends the levers are each connected by jacks 20 with the movable boards of the key bellows or pneumatics A from which latter the air is exhausted to cause the operation of their respective keys, as will be further described. Owing to the size of the bellows and the number of them they are arranged in horizontal rows and vertical tiers, as shown in Figs. 1, 2 and 4 and in rear thereof is a bank board 21 provided with passages $a$ (see Fig. 17) one of which leads to each of the key operating bellows, as shown in Figs. 2 and 10, and at their opposite ends open into chambers $a'$ normally open to the atmosphere and adapted to be controlled by valves $a^2$. Extending beneath the chambers $a'$ and connected therewith by ports is an exhaust chamber or wind-chest $b$ said ports being controlled by the valves $a^2$ the stems of which rest upon puffs or diaphragms $c$ extending over the ends of passages $c'$ leading from the primary valves C which latter are controlled by the perforations in the music sheet as it passes over the tracker board, the latter valves in turn operating the secondary valves $a^2$ as will be more fully explained hereinafter.

The tracker board 22 Figs. 1, 2, 3, 4, and 13 is arranged above the key-bed and preferably in the center of the casing and is provided with the channels or passages 23 each of which leads beneath a puff or diaphragm 24 arranged in the primary exhaust chamber or wind-chest 25 from which leads a pipe or wind-trunk 26, connected to the bellows. Each of the passages or ducts $c'$ terminates in a transversely extending aperture, one end of which opens to the atmosphere and the other leads into the wind-chest 25, the ends of said apertures being alternately closed by the heads of the primary valves C, as will be further described. The primary valves C are arranged to normally close the passage $c'$, against the entrance of air under atmospheric pressure, as shown in Figs. 16 and 21, and to open it as shown in Fig. 14, whenever a perforation in the music sheet registers with its passage 23, allowing air to be drawn into the passage $c'$ to operate the secondary valve $a^2$. To permit this arrangement of the tracker board I arrange the wind-chest containing the primary valves C at each side of said board and for convenience some of the passages 23 are located in the bottom board 27 of the chest, as shown in Figs. 14 and 16, while the others are formed by the tubes 28 which extend between the tracker board and the puffs or diaphragms 24 as shown in Fig. 13. The passages $c'$ extend around the key-bed and are formed by the pipes 29 and 29' connecting opposite ends of a portion of the passages provided in the end blocks or perforated headers, which latter are constructed in upper and lower sections 30 and 30' whereby the parts above and below the key board may be separated to facilitate their construction and also to permit them to be easily removed, in case of repair, without disturbing the piano mechanism.

The music sheet indicated by 131, Figs. 2 and 30 consisting of a band or ribbon provided with perforations adapted to register with the open ends of the various passages 23 in the tracker board, is contained upon a spool 132 from which it is unwound onto a receiving roller 133 operated by a belt 134 or other suitable connections with a wind motor of any desired construction, the bellows 135 of which are connected with the main bellows by a pipe or wind-trunk 136, as shown in Fig. 10.

In order to enable certain notes to be accented independently of other notes struck at the same instant, I divide the secondary valves and key pneumatics in groups and connect said valves and pneumatics of each group to the wind-chests which are connected by separate wind-trunks with the air exhausting devices. In the present instance, I have shown them as divided into two groups, one of which includes the treble and the other the base notes, which is accomplished by providing a partition or division wall $b^{10}$, located at, or about, the middle of the wind-chest $b$, as shown in Fig. 31.

Arranged at the bottom of the casing (in Figs. 1, 2 and 10), are the double sets of bellows, one for each group of valves and key pneumatics, located at the right and left hand sides respectively of the center of the piano and as the parts are in duplicate a description of one will suffice for both. The feeder bellows 31 (Fig. 10) is arranged at the rear side of the division board or support 32 and adjacent thereto is the low tension bellows 33 opposite which is located the high tension bellows 34 (Fig. 2). The latter is connected with the former by apertures 35 in the division board and it is also connected with the bellows 31 by a laterally extending passage 36 in said board connecting the apertures 37 and 38 leading into the high tension bellows and the feeder bellows respectively, as shown in Figs. 2, 6, 7 and 8. Springs 39 and 39' of greater and less tension are arranged to normally hold the high and low bellows respectively in the open position against the action of the feeder bellows so that either or both of the latter may be employed to create the desired attenuation of the air in the exhaust passages or wind-chests to effect the operation of the various parts with greater or less alacrity to cause a light or hard blow, as for instance the striking of the hammers 3 to form certain accented notes as will be understood. The low tension bellows being exhausted through the one of high tension will serve to keep the air in the various passages at the necessary attenuation for producing the normal operations of all of the various parts, but to enable the bellows 34 to be brought into operation I arrange between them a multiple valve 40 (Fig. 8) controlling the apertures 35. This valve is operated by a bellows $d$ (Fig. 1) with which it is connected by an arm 42 and a bell crank lever 43, said bellows being operated by a secondary valve $d'$ (Fig. 5) controlling communication between the exhaust passage $d^2$ (Figs. 3 and 4), in the tracker board, and bellows passage $d^3$ (Fig. 5), the movement of the secondary valve being governed by a primary valve D (Fig. 2), controlled by air in a continuation $D'$ of the said passage $d^2$ leading from the tracker board. A branch passage $D^2$ (Fig. 3) is also connected to the passage $D'$ and leads to the front of the piano casing where its open end is normally closed by a pivoted, manually operated valve 44, as shown in Figs. 3 and 3ª, with which engages a button $D^3$ whereby an operator may open the valve 44, to cause the operation of the bellows $d$ and thus shut off the low tension bellows to permit the expression given to any particular note or notes to be varied independently of the admission of air to the passage $d^2$ by perforations in the music sheet.

A similar arrangement to that just described is employed for operating the damper levers and the hammer rail, independently of the apertures in the music sheet, and in Fig. 9 I have illustrated particularly the means for operating the damper levers consisting of a bell crank lever 45 one end of which engages the lifting rod or jack 13 and a bellows 46 engaging the opposite end of said lever. This bellows is also adapted to be connected to the exhaust passage $e^2$ in the tracker board by a secondary valve $e$, the operation of which is controlled by a primary valve E operated by air in a passage $E'$ leading to the tracker board and also to the front of the casing, as indicated by $E^2$ where it is closed by a manually operated valve 47 adapted to be operated by a button $E^3$ as will be seen from an inspection of Figs. 1, 3 and 3ª.

The devices just described are all shown as operating upon the keys and devices upon the treble side of the piano, but it will be understood that similar mechanism is employed for operating the bass keys. In Fig. 3 I have shown the manually operated expression keys $F^3$ and $G^3$ adapted to control the multiple damper between the high and low tension bellows located at this end of the instrument, and the hammer rail. These valves are similar to those operated by the buttons $D^3$ and $E^3$, and they respectively govern the bellows $f$, connected to said multiple valve and the bellows $g$, connected to the lifting rod or jack 7 for operating the hammer rail as illustrated in Fig. 1, each of said bellows being connected by passages in the division board with the bellows 33 and 34 and operated by separate primary and secondary valves in the manner heretofore described. A balance is maintained between the two sets of high and low tension bellows by connecting them by means of a passage 48 (Figs. 8 and 32), the ends of which are adapted to be closed by valves 49 operated by stems 140 on the valves 40, whenever either of the latter is operated to throw its corresponding high tension bellows into operation.

The pipe or wind-trunk 26 leading from the exhaust chamber or wind-chest 25 of the primary key valves and a similar one 260 leading from the exhaust chamber or wind-chest *b* of the secondary key valves, both lead to an air chamber 50 connected to the passage 49' in the division board which leads into the high tension bellows through apertures 149. The air chamber is provided with apertures with which coöperates a valve 51 (see Figs. 5 and 19) which may be regulated from the exterior of the casing by any suitable connection with the rod 52 (Fig. 5) for the purpose of regulating the volume of air in said pipes or wind-trunks. The pipe 136 (Fig. 10) leading from the wind-motor 135 is connected with a chamber 53 (Figs. 19 and 20) also connected to the passage 49' and has a similar valve 54 operating therein to control the speed of the wind motor.

The pumping pedals indicated by 55, are connected to the feeder bellows 31 by curved or segmental arms 56 and at their outer ends they are attached to short links 57 which are pivotally connected to ears or lugs 58 on the inner side of a panel 59, as illustrated particularly in Figs. 10, 11 and 12. The latter forms part of the front casing and is hinged at its lower end, as shown, permitting it to be closed if desired when the piano is to be used in the ordiary manner. At the center, the panel is cut away to prevent it from interfering with the pedals 8 and 14 when it is opened outwardly and as the parts are so arranged that the panel 59 falls below said pedals they may be operated when desired without requiring that the panel be closed. Other parts of the casing are also adjustable to permit the insertion and removal of the music roll and to this end I provide the hinged panel 60, arranged in line with the tracker board which may be raised when a corresponding portion 61 of the rail may also be elevated to permit convenient access to the music sheet, as shown in dotted lines in Fig. 2.

In Figs. 22 to 27 I have shown a modified arrangement of my structure, adapting it as a separate device that may be applied to any piano. In these figures 70 indicates a casing of such form and dimension that it may be placed in front of the piano with the key hammers 71 engaging the ends of the keys, as shown in dotted lines. In this device the same parts are employed as have already been described, but on account of the increased space available in which to arrange the key operating bellows or pneumatics 72 I also locate their respective primary valves 73 and the secondary valves 74 (see Figs. 22 and 27) in proximity thereto and operate each in connection with a single exhaust passage or wind-chest 74 connected to the feeder bellows. From the tracker board 75 are the passages 76 leading beneath the primary valves whereby the latter may be operated to connect the key pneumatics with the exhaust passage. In this arrangement of the device the damper levers 5 and the hammer rail 4 of the piano are operated by bellows 77 located in a horizontal position and having fingers or projections engaging the top of the pedals 8 and 14, as shown in Fig. 22.

The air passages *c'* are normally connected to the wind-chest 25 and when the primary valve is operated to be opened to permit air, under atmospheric pressure, to pass therein and as a convenient means of arranging the parts I lead all of said passages into a channel board or support, the ends of said passages terminating in transversely extending apertures in which operate the puppet or primary valves as shown in Figs. 14, 15 and 16. This arrangement of the passages enables me to form the primary valves C with two heads 78, 78', upon opposite ends of a stem 79, adapted to alternately close the passage *c'* against communication with the air and the exhaust passage or wind-chest 25. In order to support the primary valve against displacement I flatten the stem 79 and form it of such a width that it is guided freely between the sides of the aperture in the channel board or support and in the stem I provide perforations, as shown, to permit a free circulation of air therethrough. The valves are held in position by means of flexible connections 80 such as strips of leather or tapes which extend over the rows of valves and are secured to the heads thereof and to the board at their ends. In order to hold these strips in alinement and also to permit their free movement I provide transversely extending binding pieces 81 (Fig. 28) which are also secured at their ends to the board support.

A piano constructed in accordance with my invention possesses all of the advantages of an attachment for automatically operating the keys combined in a piano casing of the usual size and appearance. The construction of the several parts as I have shown them is desirable and the arrangement of the frame, whereby the breast is made hollow is an advantageous feature as I am enabled to support the key pneumatics and other devices thereon and by employing a lever connection between the pneumatics and the keys I obtain an increase in the power with which the latter are operated and I am also enabled to operate the keys at their outer ends, and by using the leverage employed in the key when it is operated in the usual manner the effect obtained by a manual operation of the piano may be reproduced with great accuracy. Further the arrangement of the air passages or channels, connecting the operating parts at opposite sides of the key bed, permits the different portions of the mechanism to be separated thus facilitating their construction in the first instance and enabling them to be easily removed in case it is desired to repair either the operating devices or other portions of the piano. This arrangement whereby the primary valves control the secondary valves and the latter govern the key operating pneumatics also permits me to use comparatively small passages. The location of the primary valves in proximity to the tracker board causes them to respond instantly and the secondary valves operated thereby and, in turn, being arranged adjacent the key operating pneumatics cause the latter to actuate the keys without appreciable loss of time, thus allowing the passages to be made small in cross section eliminating the difficulty experienced in obtaining quick actions in pneumatic devices governed by passages in which are contained large volumes of air. These small passages enable the various parts to be compactly arranged so that they may be located in a piano casing of the usual size and without requiring the piano action to be especially constructed for their accommodation.

The arrangement of two sets of pumping bellows connected by the passage 48, which may be closed by one or the other of the valves 49 permits the air contained in them to be balanced under ordinary conditions and the pressure of said air in one to be varied independently of the air in the other when the passage is closed and said bellows is disconnected from its low tension bellows by the multiple valve 40. These valves 40 and 49 cut off the low tension bellows from their respective wind trunks and disconnect said trunks, thereby permitting the bass and treble notes operated by the pneumatics controlled by air in the separate divisions of secondary wind chest $b$ to be accented independently.

I claim as my invention:

1. The combination with a musical instrument action, keys and the casing for said action having a hollow breast, of operating devices located in the casing outside of the breast, levers connected to the keys and arranged within the breast and connections between the levers and the operating devices.

2. The combination with a musical instrument action, keys and the casing having a hollow breast extending beneath the keys, of pivoted levers arranged in the breast, operating devices arranged in the casing outside of the breast and attached to the levers and connections between the levers and keys for operating the latter and permitting their independent movement.

3. In a musical instrument playing mechanism, the combination with a key bed, a tracker board located at one side of the key bed and pneumatic devices at the opposite side thereof, of wind passages leading from said devices, coöperating passages leading from the tracker board and means for connecting the corresponding passages at the end of the key bed whereby the mechanism arranged at one side of said key bed may be removed without disturbing that at the other side.

4. In a musical instrument, the combination with a casing, a key bed therein and a hollow frame mounted in the casing and supporting said bed, of operating mechanism depending beneath the frame and supported thereby, connections between it and the outer ends of the keys operating through the frame and controlling mechanism for said devices.

5. In a musical instrument, the combination with a casing, a key bed therein and a supporting frame for the bed mounted in the casing and provided with an open portion arranged beneath the outer ends of the keys forming a hollow breast, and operating devices supported on the frame, of operating connections between said devices and the keys located in the breast and mechanism for controlling the operation of said devices.

6. In a musical instrument, the combination with a casing, a frame therein and a key bed supported on the frame, of key operating bellows supported on the frame, a wind-chest connected to said bellows and valves for controlling the latter, passages for controlling said valves arranged within the frame, a tracker board and passages leading therefrom and communicating with those in the frame.

7. In a musical instrument, the combination with a casing, a frame therein, a key bed arranged in the casing and key-operating bellows supported on the frame, of a wind-chest connected to said bellows, controlling valves therefor located beneath the key bed, a tracker board located above the key bed and passages leading around the end of said bed and governing the movement of the valves.

8. In a musical instrument, the combination with a casing, a key bed therein and key operating bellows arranged beneath the bed, a wind-chest connected thereto and valves for controlling the operation of the bellows, of a tracker board located above the key bed and controlling passages extending laterally from the tracker board and leading around the ends of the key bed to the valves located beneath the latter.

9. In a musical instrument, the combination with a casing, a key bed therein and key operating bellows arranged beneath the bed, a wind-chest connected thereto and secondary valves for controlling the operation of the bellows, of a tracker board, a wind-chest and primary valves operated from the tracker board and located above the key bed and passages connecting the primary and secondary valves.

10. In a musical instrument, the combination with a key bed, key operating bellows, a wind-chest and a secondary valve therein controlling the operation of the bellows all arranged below the key bed, of a tracker board, a wind-chest and a primary valve, located above the key bed and a passage connecting the two valves.

11. In a musical instrument, the combination with a key bed, key operating bellows, a wind-chest and a secondary valve for each bellows all arranged beneath the key bed, of a tracker board, a wind-chest and primary valves operated from the tracker board and located above the key bed, passages leading from the primary valves to the secondary valves and passing through a header comprising separate parts located at the ends of the key board whereby the devices at opposite sides of the latter may be disconnected.

12. In a musical instrument, the combination with the keys, key pneumatics and a wind-chest connected to some of the key pneumatics and another wind-chest connected to the remaining pneumatic, of feeder bellows attached to each wind-chest, a passage connecting said bellows, a valve controlling the passage and means for operating it whereby either bellows may be connected to its respective wind-chest independently of the other bellows.

13. In a musical instrument, the combination with keys, key pneumatics arranged in groups, a high tension bellows and a low tension bellows, a wind chest for each group of pneumatics, each wind chest communicating with the high and low tension bellows and a valve for disconnecting one of said bellows from the wind chests, means for operating the valve and a feeder bellows connected to both the high and low tension bellows.

14. In a musical instrument, the combination with keys, key pneumatics, a plurality of wind-chests each connected to a group of key-pneumatics, of feeder-bellows, a pair of bellows for each group connected to the corresponding wind-chest and to the feeder-bellows, each pair comprising a low tension and a high tension bellows, a passage connecting the bellows of each pair and a passage connecting the several pairs of bellows, a valve for disconnecting the low and high tension bellows of each pair and a valve for closing the connecting passage of said pairs and means for operating the valves.

15. In a musical instrument, the combination with the keys, pneumatic devices for operating them, said devices being arranged in groups, a feeder bellows and a pair of high and low tension bellows for each of said groups, of separate wind-chests, one for each group and passages each connecting one of them with the high tension bellows of its respective pair of bellows, a passage connecting the high and low tension bellows of each pair and a valve for closing said passage.

16. In a mechanical operating mechanism for musical instruments, the combination with an action, keys, key pneumatics and a plurality of feeder bellows, low and high tension bellows arranged in pairs and connected to their respective feeder bellows, passages connecting the low and high tension bellows of each pair and a passage connecting said pairs of bellows for balancing them, wind-trunks leading from each high tension bellows to the key pneumatics, valves for closing the passages between the respective low and high tension bellows of each pair and also the passage between the different pairs of bellows, and means for operating said valves.

17. In a musical instrument embodying keys and operating pneumatics therefor, the combination with a feeder bellows and a division board, a high tension bellows and a low tension bellows thereon, of passages in the board connecting said bellows and connecting them with the feeder bellows, a wind-trunk connecting the pneumatic devices and the passage between the latter and the low tension bellows and pneumatic devices for operating said damper.

18. In a musical instrument embodying keys and pneumatic operating devices therefor, the combination with a feeder bellows and a division board, a high tension bellows located at one side thereof and a low tension bellows located at the other side of said board, of passages in the board connecting the high and low tension bellows and connecting them with the feeder bellows and a wind-trunk connecting the key operating pneumatic devices with the high tension bellows, a damper for closing the passage between the latter and the low tension bellows and pneumatic devices for operating said damper.

19. In a musical instrument embodying the keys and pneumatic operating devices therefor arranged in sets, the combination with a feeder bellows and a plurality of pairs of high and low tension bellows connected to the feeder bellows, of passages connecting the respective high and low tension bellows of each pair, another passage affording communication between the separate pairs of bellows, and wind-ways one leading from each of the several sets of pneumatic devices to the several high tension bellows, damper devices for closing communication between the high and low tension bellows of each pair, said damper devices also operating to close the passage affording communication between said pair and the other pairs of bellows and means for operating the damper devices.

20. In a musical instrument, the combination with keys, key pneumatics arranged in groups and normally-connected high and low tension bellows, of separate wind-chests each connected to one of the groups of pneumatics and communicating with said bellows, a valve for disconnecting one of said bellows from the other and another valve for disconnecting all but one of the wind-chests from said other bellows, means for operating the valves and a feeder bellows connected to said low and high tension bellows.

21. In a self playing musical instrument and in combination with the action and manually operable keys, of a tracker board located above the keys, key-pneumatics located beneath them and passages extending between the tracker board and pneumatics leading around the ends of the key bed.

22. In a self playing musical instrument and in combination with the action and manually operable keys, of a controlling mechanism located above the keys, a key operating mechanism located beneath them and connections extending between the controlling and operating mechanisms leading around the ends of the key bed.

23. In a musical instrument, the combination with keys, key pneumatics and feeder and main bellows arranged at one side of the key bed, of a wind chest located at the other side of the bed, valves arranged therein for controlling the operation of the pneumatics and a tracker board supported on the wind chest.

24. In a musical instrument, the combination with keys, key pneumatics and feeder and main bellows arranged at one side of the key bed, of wind chests located at the other side of the key bed, a tracker board located between them and valves in the chests for controlling the pneumatics.

25. In a musical instrument, the combination with keys, key pneumatics and feeder and main bellows arranged at one side of the key bed, of a wind chest located at the other side of the key bed, a tracker board supported thereon, said chest and tracker board forming a single member, valves in the chest and passages leading therefrom to the ends of the member and thence to the pneumatics.

26. In a musical instrument, the combination with a support, keys, key pneumatics and feeder and main bellows arranged at one side of the key bed, of a member comprising a wind chest and a tracker board arranged at the other side of the key bed, and held at its ends on the support and valves in the chest connected to and controlling the pneumatics.

27. The combination with a board having a passage and disposed with one of its edges elevated above the other, and two feeder bellows arranged centrally on one side of the board and connected to the passage, of two main bellows arranged on the same side of the board, one being located at each end thereof and connected to the passage and pedals for operating the centrally arranged feeders.

28. The combination with a board having a passage therein, high and low tension bellows mounted on opposite sides of the board and connected to the passage, of a feeder bellows also mounted on the board and connected to the passage and means for operating the feeder bellows.

29. The combination with a board having a passage therein, conjointly operating high and low tension bellows arranged in pairs at the ends of the board, the two bellows of each pair being located at opposite sides of the board and connected to the passage, of two feeder bellows located between the pairs of high and low tension bellows and means for operating the feeders.

30. In a musical instrument, the combination with a casing, an open frame mounted thereon having a cross bar dividing it into forward and rear compartments and a plurality of keys arranged above the frame, of operating mechanism supported in the rear compartment and connections between said mechanism and the keys located in the forward compartment of the frame.

31. In a musical instrument, the combination with a key bed, key operating bellows arranged beneath the bed, a wind chest therefor and valves for controlling the operation of the bellows, of a tracker board located above the key bed, passages leading from the tracker board to the controlling valves and passing through a header located at the end of the key bed and comprising separable parts.

32. In a piano player, the combination with a divided pneumatic chamber, of the independent trunks connected thereto and having orifices, suitable controlling valves for the orifices, and independent exhaust reservoirs communicating with each trunk, and exhausters for each reservoir, means for operating the exhausters, and a by-pass extending between the exhaust reservoirs.

33. In a musical instrument, the combination with a casing, keys therein, key-pneumatics and secondary valves controlling their operation and located beneath the keys, of primary valves located above the keys and controlling the operation of the secondary valves, wind-chests for both the primary and secondary valves, bellows and separate trunks leading therefrom and connected to said chests.

34. In a musical instrument, the combination with a casing, keys therein, key pneumatics, secondary valves controlling their operation and a wind chest for said valves all arranged beneath the keys, of primary valves controlling the operation of the secondary valves and a primary wind-chest located above the keys, bellows and separate wind trunks leading therefrom and connected to said wind chests.

JOHN J. HEALY.

Witnesses:
  HELEN M. HESS,
  G. WILLARD RICH.